(12) United States Patent
Baker et al.

(10) Patent No.: US 11,521,488 B1
(45) Date of Patent: *Dec. 6, 2022

(54) METHOD AND SYSTEM FOR DETECTING USE OF GARAGE

(71) Applicant: UIPCO, LLC, San Antonio, TX (US)

(72) Inventors: Kelly Q. Baker, San Antonio, TX (US); Sumita T. Jonak, San Antonio, TX (US); Will Kerns Maney, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,964

(22) Filed: Jan. 28, 2022

Related U.S. Application Data

(63) Continuation of application No. 17/022,827, filed on Sep. 16, 2020, now Pat. No. 11,276,303, which is a continuation of application No. 16/424,602, filed on May 29, 2019, now Pat. No. 10,847,027.

(60) Provisional application No. 62/753,105, filed on Oct. 31, 2018.

(51) Int. Cl.
*G08G 1/14* (2006.01)
*G08G 1/017* (2006.01)
*G06Q 50/22* (2018.01)
*G06Q 40/08* (2012.01)

(52) U.S. Cl.
CPC ............ *G08G 1/017* (2013.01); *G06Q 50/22* (2013.01); *G08G 1/146* (2013.01); *G06Q 40/08* (2013.01)

(58) Field of Classification Search
CPC ........ G08G 1/017; G08G 1/146; G06Q 50/22; G06Q 40/08
See application file for complete search history.

(56) References Cited

U.S. PATENT DOCUMENTS

| | | |
|---|---|---|
| 9,104,886 B1 | 8/2015 | Dolbakian et al. |
| 9,505,494 B1 | 11/2016 | Marlow et al. |
| 9,679,486 B2 | 6/2017 | Li et al. |
| 10,176,718 B1 | 1/2019 | Mazuir et al. |
| 10,354,334 B1 | 6/2019 | Chan et al. |
| 10,474,904 B1 | 11/2019 | Correnti |
| 10,553,113 B2 | 2/2020 | Nangeroni et al. |
| 10,847,027 B1 | 11/2020 | Baker et al. |
| 2006/0188246 A1 | 8/2006 | Terre et al. |
| 2014/0135040 A1 | 5/2014 | Edge et al. |
| 2014/0200846 A1 | 7/2014 | Wachter et al. |
| 2014/0236686 A1 | 8/2014 | Grush et al. |
| 2014/0257871 A1 | 9/2014 | Christensen et al. |
| 2015/0084779 A1 | 3/2015 | Saladin et al. |
| 2015/0187015 A1 | 7/2015 | Adams et al. |
| 2015/0294572 A1 | 10/2015 | Anstett |

(Continued)

*Primary Examiner* — Nay Tun
(74) *Attorney, Agent, or Firm* — Plumsea Law Group, LLC

(57) ABSTRACT

A system and method for detecting if a vehicle is being parked in a garage is disclosed. The method includes detecting sensory information at a vehicle and comparing the sensory information with ambient conditions outside of a garage to determine if the vehicle is likely in the garage or outside. The sensory information may also be compared to ambient conditions inside of a garage to determine if the vehicle is likely inside the garage or not. The method also includes sending reminders to vehicle owners who are not using their garage frequently. The method also includes automatically adjusting an insurance policy according the frequency of garage use.

20 Claims, 9 Drawing Sheets

(56) References Cited

U.S. PATENT DOCUMENTS

| | | |
|---|---|---|
| 2017/0021764 A1 | 1/2017 | Adams et al. |
| 2017/0115398 A1 | 4/2017 | Li et al. |
| 2018/0276700 A1 | 9/2018 | Wang |
| 2019/0012906 A1 | 1/2019 | Altinger et al. |
| 2019/0073701 A1 | 3/2019 | Sonnad et al. |
| 2019/0271546 A1 | 9/2019 | Ueno et al. |
| 2019/0385452 A1 | 10/2019 | Nangeroni et al. |

METHOD AND SYSTEM FOR DETECTING USE OF GARAGE

CROSS-REFERENCE TO RELATED APPLICATIONS

This application is a continuation of U.S. patent application Ser. No. 17/022,827, filed on Sep. 16, 2020 and titled "Method and System for Detecting Use of Garage", which application is a continuation of U.S. patent application Ser. No. 16/424,602, filed on May 29, 2019 and titled "Method and System for Detecting Use of Garage", which application claims the benefit of U.S. Provisional Patent Application No. 62/753,105, filed Oct. 31, 2018 and titled "Method and System for Detecting Use of Garage," the disclosures of each of which applications are incorporated by reference herein in their entirety.

TECHNICAL FIELD

The present disclosure generally relates to methods and systems for automatically detecting use of a garage, and in particular to using sensors to detect when a vehicle is parked in a garage.

BACKGROUND

Vehicle owners are often required to have vehicle insurance in the event of damage or loss to the vehicle or its contents. To calculate a vehicle owner's insurance premium an insurance provider may consider a variety of factors. These can include the cost of the vehicle, the condition of the vehicle, the age of the vehicle and the driver's age.

Storing a vehicle in a garage may help to deter vehicle theft. Some insurance providers may therefore offer discounted premiums to driver's who park their vehicles in a garage. However, providers do not have a way to confirm that the driver is using the garage on a regular basis.

There is a need in the art for a system and method that addresses the shortcomings discussed above.

SUMMARY

In one aspect, a method of determining if a vehicle is being parked in a garage, where the vehicle is associated with an insurance policy, includes steps of retrieving sensory information from a first sensor associated with the vehicle, retrieving sensory information from a second sensor, the second sensor being disposed further from the vehicle than the first sensor, and comparing the sensory information from the first sensor with the sensory information from the second sensor to determine if the vehicle is parked in the garage. The method also includes a step of sending a message to an owner of the insurance policy when the vehicle has not been parked in the garage at least once within a predetermined period.

In another aspect, a method of determining if a vehicle is being parked in a garage, where the vehicle is associated with an insurance policy, includes steps of retrieving sensory information from a first sensor associated with the vehicle and retrieving ambient condition data from a remote server. The method also includes steps of comparing the sensory information from the first sensor with the ambient condition data from the remote server to determine if the vehicle is parked in the garage and sending a message to an owner of the insurance policy when the vehicle has not been parked in the garage at least once within a predetermined period.

In another aspect, a method of determining if a vehicle is being parked in a garage, where the vehicle is associated with an insurance policy, includes steps of retrieving sensory information from a first sensor associated with the vehicle and retrieving sensory information from a second sensor, the second sensor being disposed externally to the vehicle. The method also includes steps of comparing the sensory information from the first sensor with the sensory information from the second sensor to determine if the vehicle is parked in the garage and automatically updating the insurance policy.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Although GPS or similar location information may be available through GPS receivers on a vehicle or on a mobile device (such as a smartphone) inside the vehicle, the provided locations may not be accurate enough to confidently determine if a vehicle is located in a garage or in a driveway just outside of the driveway. Therefore the embodiments provide systems and methods that use other kinds of sensory information to detect whether a vehicle is being parked in a garage on a regular basis.

When the vehicle is not being parked in the garage on a regular basis, the system may automatically send a policy holder of the vehicle insurance policy a message. If the policy holder is already receiving a discount, the message may include a reminder to park the vehicle in the garage more frequently so that the policy holder remains eligible for the discount. If the policy holder is not already receiving a discount, the message may inform the policy holder about eligibility for the discount. In some cases, the system can automatically adjust the insurance policy to reflect a discount.

Garage use can be detected by analyzing various sensory information associated with the vehicle, the garage interior and/or the exterior environment outside the garage. Differences in ambient conditions (such as temperature, humidity, air pressure, wind speed, ambient light levels, as well as other ambient conditions) between the vehicle and the exterior environment can be used to determine if the vehicle is likely being parked in a garage. Similarly, similarities in ambient conditions between the vehicle and the garage interior can be used to determine if the vehicle is likely being parked in a garage. By automatically detecting if a vehicle is being parked inside a garage or outside, the system and method can help an insurance provider save costs by ensuring discounts are only given to customers who are regularly parking their vehicle in a garage. The system can also improve customer satisfaction by automatically adjusting insurance policies to reflect discounts for parking in a garage.

Figure 1:
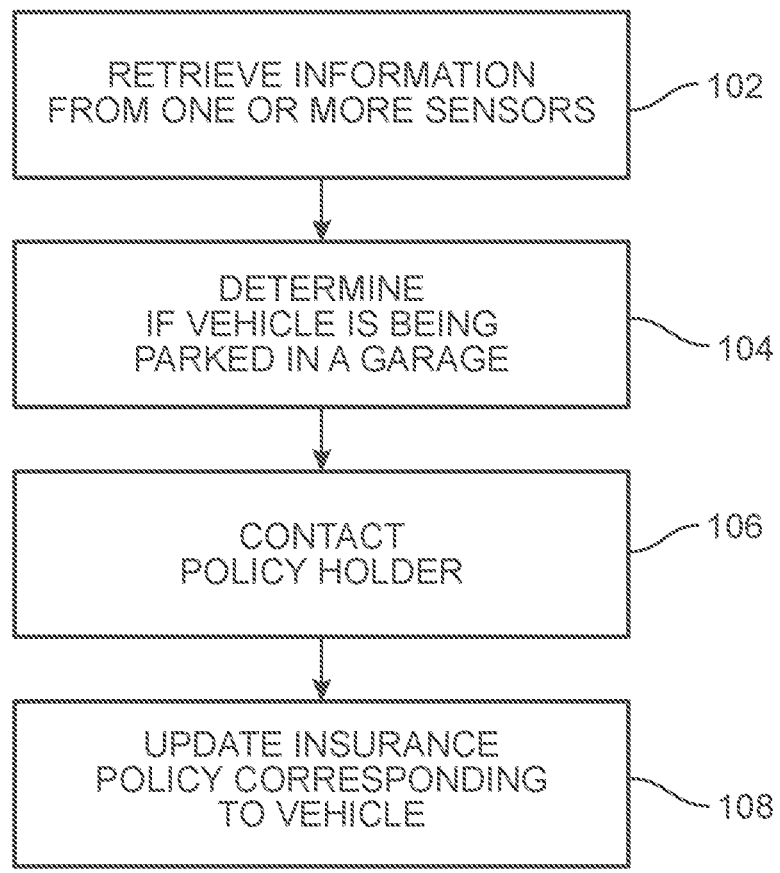
FIG. 1 is a schematic view of a process for detecting if a vehicle is being parked in a garage, according to an embodiment.

FIG. 1 is a schematic view of a process for detecting if a vehicle is being parked in a garage and also updating an insurance policy associated with the vehicle, according to an embodiment. As used herein, the term "garage" refers to any building, shed or other structure used to house one or more vehicle, including motor vehicles such as cars, buses, motorcycles and trucks. Although the exemplary embodiments are directed to garages for motor vehicles such as cars, similar principles could be applied to hangars for planes and other kinds of structures for storing boats and other vehicles, especially vehicles that require insurance.

In the present embodiment, one or more of the steps in this process may be performed by an insurance provider. The term "insurance provider" (or simply "provider") as used herein refers to any institutions or companies that provide insurance products. Insurance products can include home owner's insurance, renter's insurance, commercial property insurance, and vehicle insurance. An insurance product may be characterized by an insurance policy, which is a contract between an insurance provider (the "insurer") and a policy holder (the "insured"). In cases where vehicle insurance is provided, the policy holder may be an owner and/or driver of a vehicle. The policy holder may also be referred to as a customer of the insurance provider.

In step 102, a provider may retrieve information from one or more sensors. As discussed in further detail below, the sensors could be associated with a vehicle, with the interior of a garage, and/or with an environment external to a garage (i.e., a non-enclosed space). The type of sensors could vary, and may generally include optical based sensors (for example, cameras), audible based sensors (for example, microphones), electrical sensors, temperature sensors, humidity sensors, pressure sensors, light level sensors, wind speed sensors, motion sensors, as well as other suitable sensors.

Next, in step 104, the information from the one or more sensors may be used to determine if a vehicle is being parked in a garage. More specifically, this step may include determining if the vehicle is being parked in the garage with sufficient frequency. In some cases, the provider may check that the vehicle is being parked in the garage at least once within a predetermined period, such as once a day or once a week.

In step 106, the provider may contact the policy holder. For example, a policy holder who is already receiving a discount on their insurance premium for having a garage may receive reminders when the provider determines that they are not storing their vehicle in the garage frequently. As another example, a policy holder who is not already receiving discounts may receive information about insurance premium discounts when the insurance provider detects that the policy holder is parking their vehicle in a garage with sufficient frequency.

In step 108, the provider may update an insurance policy corresponding to the vehicle. In some cases, the provider could automatically remove discounts for having a garage when the garage is not being used sufficiently frequently. In other cases, the provider could automatically add discounts for regular use of a garage when the vehicle is being parked in the garage with sufficiently frequently (and when the discount has not previously been applied to the insurance policy). It may be appreciated that adding discounts amounts to reducing an insurance premium, while removing discounts amounts to increasing an insurance premium.

Figure 2:
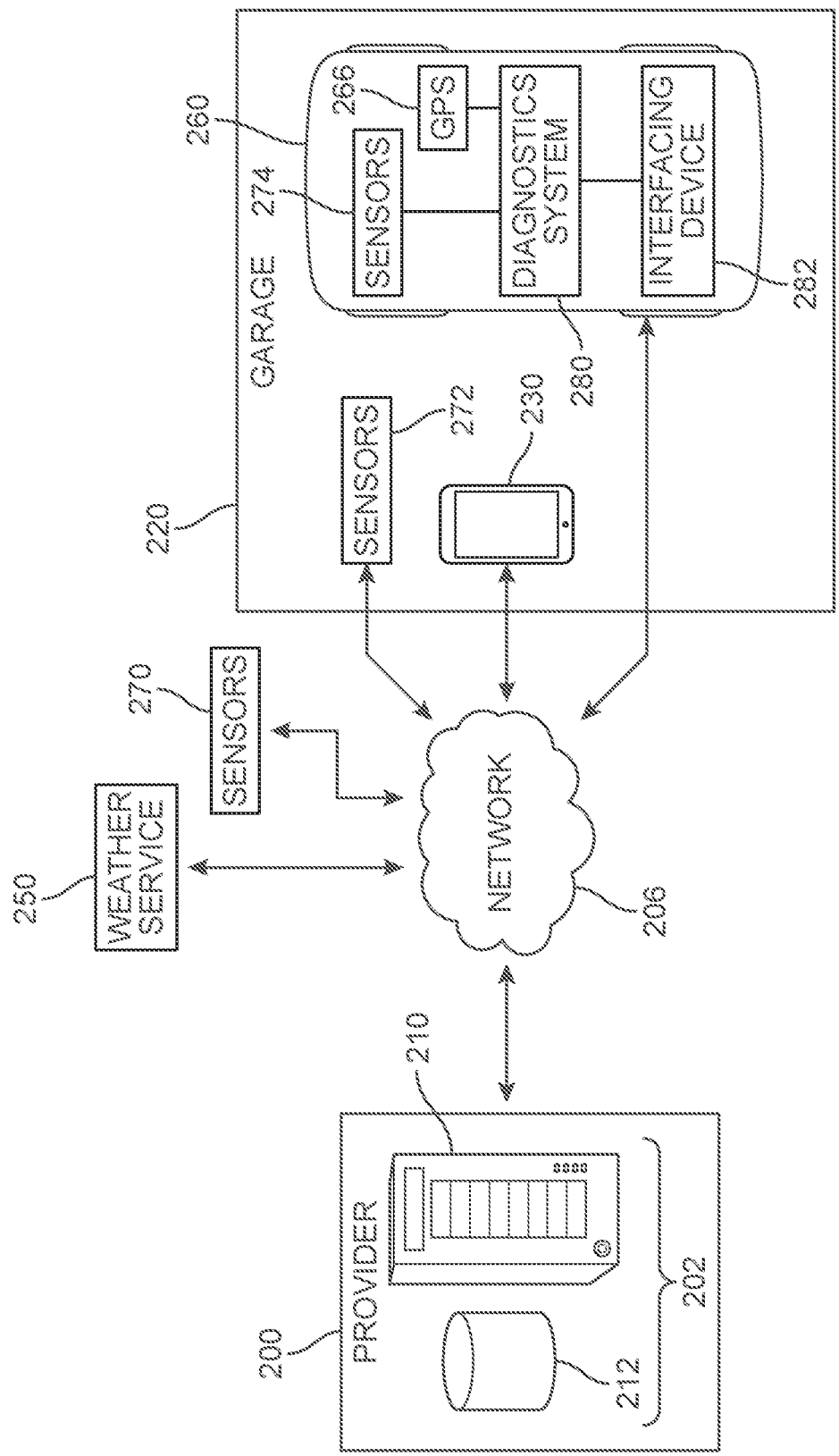
FIG. 2 is a schematic view of a system for receiving sensed information and analyzing the information to detect garage use, according to an embodiment.

FIG. 2 is a schematic view of many of the systems and devices that may be used to extract and process sensory data from a vehicle, garage or the area outside of the garage. Referring to FIG. 2, provider 200 may comprise a centralized computing system 202. The term "computing system" refers to the computing resources of a single computer, the partial computing resources of a single computer, a plurality of computers communicating with one another, or a network of remote servers. In an exemplary embodiment, computing system 202 includes at least one server.

In the embodiment of FIG. 2, centralized computing system 202 comprises one or more computing devices 210 (for example, a server) that may be in communication with one or more databases 212. Computing device 210 may include one or more processors and a non-transitory computer readable medium. Instructions stored on the non-transitory computer readable medium may be executed by the one or more processors. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

Provider 200, including computing system 202, may communicate with one or more sensory devices (or simply, sensors). Sensors could be disposed in various different locations. Some embodiments may include sensors disposed externally to a garage. In the embodiment of FIG. 2, provider 200 may receive sensory information from a set of external sensors 270 that may be disposed outside of a garage 220. Set of external sensors 270 may be used to sense the ambient conditions outside of garage 220. Some embodiments may include sensors disposed within a garage. In the embodiment of FIG. 2, provider 200 may receive sensory information from a set of garage sensors 272. Set of garage sensors 272 may be used to sense the ambient conditions inside of garage 220. Some embodiments may also include set of vehicle sensors 274 associated with a vehicle 260. Set of vehicle sensors 274 may be used to sense the ambient conditions inside of, or proximally to, vehicle 260.

Each of the sensors described above (including set of external sensors 270, set of garage sensors 272 and set of vehicle sensors 274) may be capable of transmitting sensory information to computing system 202 of provider 200 over network 206. The format of the sensory information may vary according to the type of sensory information being transmitted. In some embodiments, communication with computing system 202 may be facilitated by another computing device. For example, in one embodiment sensors disposed in the garage and/or externally to the garage could communicate with a central computing device located in a house or other building adjacent the garage. This communication could occur via wired or wireless means. In some cases, the communication could occur over a local area network. In some cases, the communication could occur over a personal area network. The central computing device could then communicate with computing system 202 over network 206.

In some embodiments, information from sensors disposed in or on a vehicle may be accessible through a diagnostics system 280 of vehicle 260. Diagnostics system 280 may be associated with on-board diagnostics (OBD) capabilities. In some cases, diagnostics system 280 may comprise part of an onboard computing system of vehicle 260.

In order to access diagnostics system 280, some embodiments may include an interfacing device 282. Interfacing device 282 may include any device that can interface with diagnostics system 280 and also communicate with computing device 202 over a network, or via an intermediate local computing device. Interfacing device 282 could communicate with diagnostics system 280 using various interfacing protocols and hardware. Exemplary interfaces include OBD-I, OBD-1.5, and OBD-II. Interfacing devices can comprise hand-held scan tools, mobile device-based tools, PC-based scan tools, data loggers and telematics devices.

In one embodiment, interfacing device 282 is a telematics device. The term "telematics device" refers to any device that can plugged into an interfacing port (for example, an OBD-II port) on a vehicle and used to track information from sensors and/or other onboard systems. In some embodiments, a telematics device may be configured to wirelessly communicate with other computing devices. In other embodiments, a telematics device may track and store information that can be accessed at a later time by removing the device and plugging it into another computing device (for example, using a USB cord).

In some embodiments, location information for a vehicle can also be retrieved using an interfacing device 282. In the example of FIG. 2, vehicle 260 includes an onboard GPS receiver 266 that can receive GPS information. This information can be accessed by interfacing device 282 via diagnostics system 280. In other embodiments, GPS information, or any other location or navigation information, can be retrieved from any other suitable devices in a vehicle.

Provider 200 could also communicate with a user device 230, which may be carried in, or adjacent to, vehicle 260. User device 230 may comprise a computing system for processing and communicating information. A user device may generally include a processor, a data storage component, and a display. A user device may also include components to facilitate communication with external systems (for example, hardware and software components to enable communication over network 206). In some cases, a user device includes one or more physical buttons. In some cases, a user device includes touchscreen controls. Additionally, user device 230 could include additional sensors including, but not limited to: accelerometers, gyroscopes, magnetometers, GPS receivers, barometers, proximity sensors and ambient light sensors.

In the exemplary embodiment of FIG. 2, user device 230 comprises a mobile device. Specifically, user device 230 comprises smartphone. In other embodiments, user device 230 could be a tablet computing device. In still other embodiments, however, a user device could comprise a laptop, a desktop computer, or similar kind of device.

Any of the devices described above may be configured to operate in a client-server relationship with computing system 202 of provider 200. For example, computing system 202 may include a server that communicates with interfacing device 282 over network 206. Computing system 202 could also communicate with sensors or local computing devices that are themselves connected to sensors. Information from these various devices may be sent to computing system 202 for analysis and/or storing data.

In some embodiments, user device 230 may run client software to control one or more sensors of the device, retrieve sensory information, store sensory information and/or send sensory information to computing system 202 for analysis. In addition, messages may be automatically sent to user device 230 to inform a user of changes to an insurance policy and/or to request further action regarding the insurance policy.

In some embodiments, provider 200 may also be configured to communicate directly with third party services that can provide information about ambient conditions outside of a garage. In one embodiment, computing system 202 of provider 200 can communicate directly with servers of a weather service 250. When the address of the garage is known, ambient conditions can be retrieved for the area including the garage. Examples of ambient conditions that could be retrieved from weather service 250 include, but are not limited to: temperature, humidity, pressure, ambient light levels, and wind speed.

Figure 3:
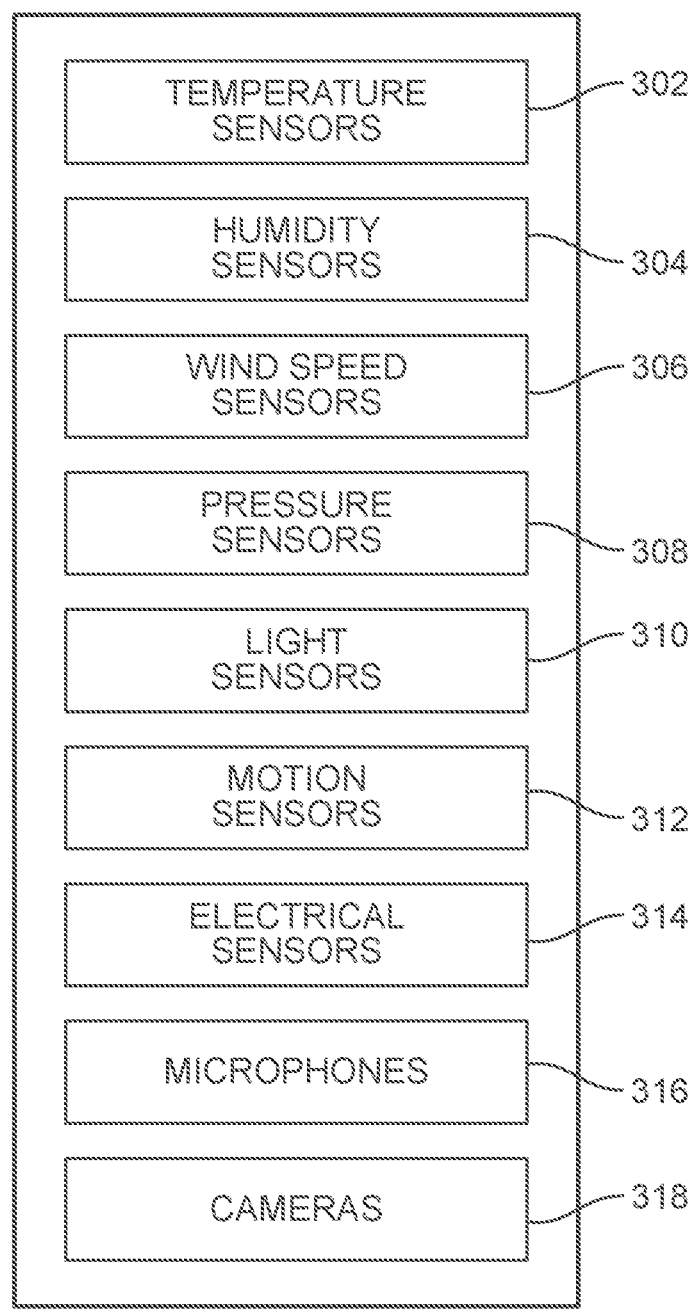
FIG. 3 is a schematic view of various sensors that could be used with the exemplary system of FIG. 2, according to an embodiment.

FIG. 3 is a schematic view of various kinds of sensors that could be associated with set of external sensors 270, set of garage sensors 272 and/or vehicle sensors 274. It may be appreciated that different sensors can be used with each set of sensors. For example, while vehicle sensors 274 could include a temperature sensor, temperature information for the ambient conditions outside of garage could be retrieved from weather service 250, rather than directly from a local temperature sensor.

Exemplary sensors include sensors for detecting ambient conditions, including temperature sensors 302, humidity sensors 304, wind speed sensors 306, pressure sensors 308 and light sensors 310. Exemplary sensors can also include motion sensors 312, electrical sensors 314, microphones 316 and cameras 318.

Temperature sensors 302 can be used to detect the ambient temperature outside the garage, the ambient temperature within the garage and/or the temperature of the car, depending on the placement of the sensors. Any known temperature sensors could be used. By comparing the temperature detected at the vehicle with the exterior and/or garage interior temperatures, it may be possible to determine whether the vehicle is likely outside or inside of the garage.

Humidity sensors 304 can be used to detect the ambient humidity outside the garage, the ambient humidity within the garage and/or the ambient humidity around the vehicle, depending on the placement of the sensors. Any known humidity sensors could be used. By comparing the humidity detected at the vehicle with the exterior and/or garage interior humidity, it may be possible to determine whether the vehicle is likely outside or inside of the garage.

Wind speed sensors 306 can be used to detect the ambient wind speed outside the garage, the ambient wind speed within the garage and/or the wind speed around the vehicle, depending on the placement of the sensors. Any known wind speed sensors could be used. By comparing the wind speed detected at the vehicle with the exterior and/or garage interior wind speeds, it may be possible to determine whether the vehicle is likely outside or in the garage. In some embodiments, it may be assumed that the wind speed within a garage is negligible, and so no wind speed sensor may be required within a garage for comparison.

Pressure sensors 308 can be used to detect the ambient pressure outside the garage, the ambient pressure within the garage and/or the ambient pressure around the vehicle depending on the placement of the sensors. Any known pressure sensors could be used. In some cases, the pressure sensors are configured to detect barometric or atmospheric pressure. By comparing the pressure detected at the vehicle with the exterior and/or garage interior pressures, it may be possible to determine whether the vehicle is likely outside or inside of the garage.

Light sensors 310 can be used to detect the ambient light levels outside the garage, the ambient light levels within the garage and/or the ambient light levels at a vehicle, depending on the placement of the sensors. Any known light level sensors could be used. By comparing the light levels detected at the vehicle with the exterior and/or garage interior light levels, it may be possible to determine whether the vehicle is likely outside or inside of the garage.

Motion sensors 312 could comprise any kinds of motions sensors known in the art. These may include, but are not limited to: passive infrared sensors, microwave sensors, and ultrasonic sensors. Motion sensors could be deployed at selective locations. In one embodiment, for example, one or more motion sensors 312 may be disposed proximally to a garage door to detect when a vehicle or occupant enters and/or exits the garage.

Electrical sensors 314 could comprise various kinds of sensors for detecting electrical activity in one or more systems. For example, potentiometers, or devices for measuring current, could be connected to one or more components of a garage door opening system to detect when the garage door opens and closes. In another embodiment, electrical sensors could be connected to a light switch in a garage and information from the electrical sensors could be used to infer how frequently the light in the garage is being turned on and off. Knowing when the garage door is opened and closed, as well as when the lights are on or off, could be correlated with other information from a vehicle to determine whether a vehicle is likely being parked inside or outside of a garage.

Additionally, any known microphones 316 and/or cameras 318 can be used to detect audio information and optical information. By analyzing audio information and/or optical information, a provider could determine if a vehicle is being parked in the garage. For example, video information showing a forward facing view of a vehicle just before the vehicle is turned off and after the vehicle is turned on may be analyzed to determine if the vehicle is likely in an enclosed space, such as a garage. In some embodiments, sounds detected at a vehicle can be analyzed to infer if the vehicle is more likely in an indoor or outdoor environment.

It may be appreciated that a user device (such as user device 230) could also include some of the sensors depicted in FIG. 3. As an example, some user devices may include temperature sensors, humidity sensors, light sensors, motion sensors, microphones and cameras. In addition, a user device may also include a GPS receiver to determine location information. However, user devices need not include all of the sensors depicted in FIG. 3.

Figure 4:
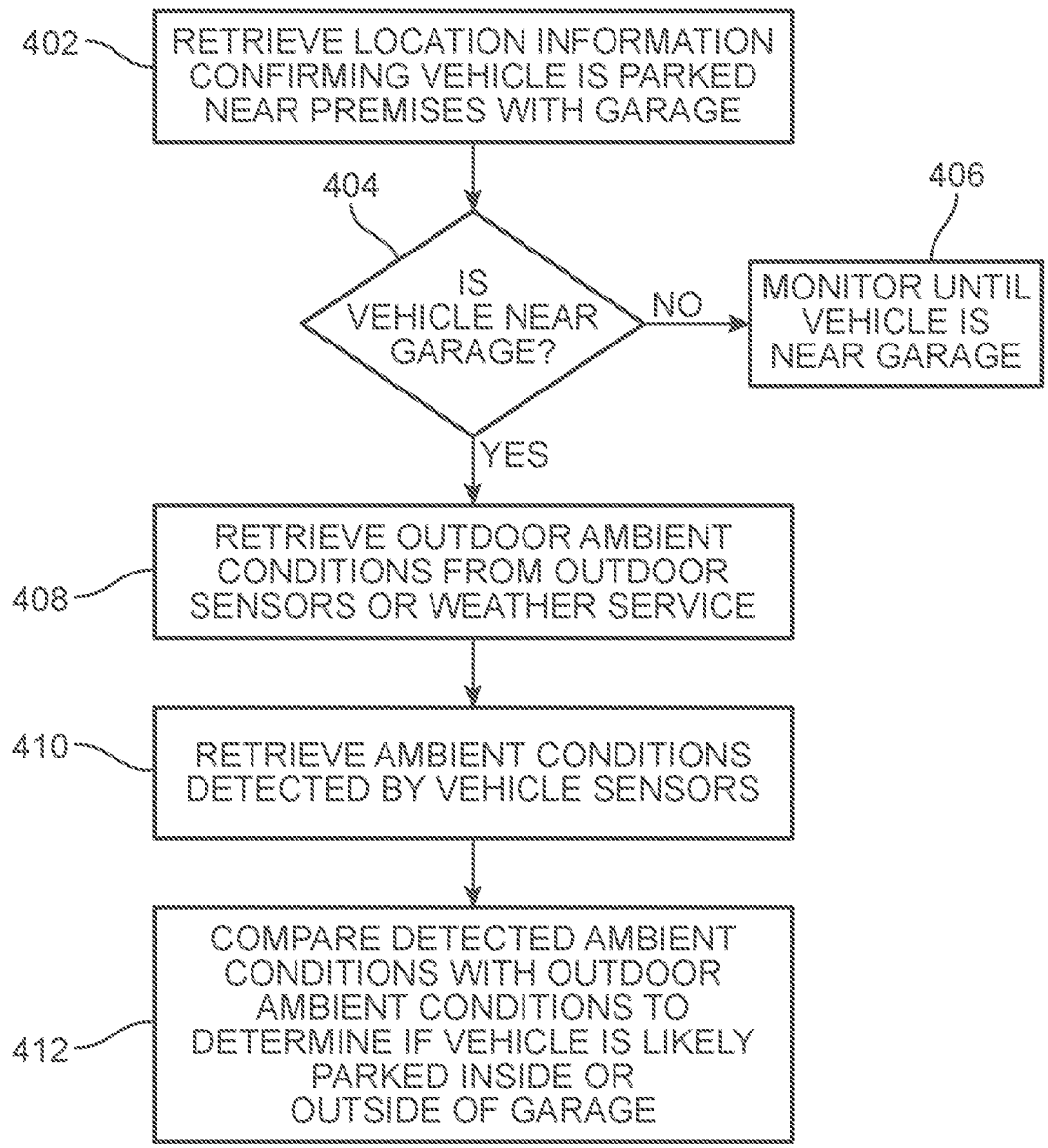
FIG. 4 is a schematic view of a process for determining if a vehicle is being parked in a garage, according to an embodiment.

FIG. 4 is a schematic process for automatically determining if a vehicle is parked in a garage. For convenience, the following steps are described as being performed by a computing system operated by a provider (for example, provider 200 in FIG. 2). However, it may be appreciated that some of these steps can be performed by one or more systems operated by another entity. In one embodiment, the following steps can be performed by software running on a computing system (for example, computing system 202) that is maintained by a provider (for example, provider 200).

It may be appreciated that the following steps could be performed at the time that the sensory information is collected or could be performed at a later time. In one embodiment, the computing system may be in continuous communication with the interfacing device (for example, interfacing device 282 of FIG. 2). In this case, the sensory information can be retrieved and analyzed in real time, or in near real time. In another embodiment, however, the sensory information can be tracked and then analyzed at a later time, for example at regularly established intervals like once a day, once a week or once a month. Moreover, in some cases all tracked data may include a time stamp, allowing sequential data to be analyzed by comparing different data sets at the same times.

In step 402, the computing system may retrieve location information to check that a vehicle is parked near a garage. As used herein, being parked "near a garage" includes being parked directly adjacent a garage, as well as being parked in a garage. As already discussed, the GPS location may be sufficient to determine that a vehicle is parked "at home" but may be too inaccurate to determine if the vehicle is parked in the garage or just outside of the garage. In some other embodiments using advanced GPS systems with high precision (for example, accuracy to within 50 centimeters), the GPS location could be used to detect that the garage is parked inside or outside with a high degree of accuracy. In such a case, analyzing sensory information using the process described below could serve as a confirmation for determining that the vehicle is in the garage (or not) directly from GPS location information.

In some embodiments, the location information can be retrieved from GPS information determined by a vehicle's onboard computer using a GPS receiver (for example, GPS receiver 266 of FIG. 2). In other embodiments, the location information can be retrieved from user device 230. User device may determine location information from a GPS receiver, from cell tower signal analysis, or using any other known methods.

If the computing system determines that the vehicle is not located near the garage in step 404, the system proceeds to step 406. At step 406, the computing system may continue to monitor location data for the vehicle until the vehicle is located near the garage. Step 402 and step 404 may help reduce the amount of time the computing system spends analyzing sensory information, by excluding periods of time where the vehicle is not near the garage from further analysis.

If the computing system determines that the vehicle is located near the garage in step 404, the system proceeds to step 408. In step 408 the computing system retrieves the outdoor ambient conditions outside of the garage. In some embodiments, the outdoor ambient conditions can be determined by sensors disposed externally to a garage (for example, set of external sensors 270 of FIG. 2). In other embodiments, the outdoor ambient conditions can be determined by looking up weather data from a weather service (for example, weather service 250).

Next, in step 410, the computing system retrieves the ambient conditions detected by any sensors associated with the vehicle. These can include sensors integrated into the vehicle (such as set of vehicle sensors 274). These may also include sensors from a user device disposed in the vehicle (such as user device 230).

Following this, in step 412, the computing system may compare the ambient conditions detected by the vehicle sensors with outdoor ambient conditions. Based on this comparison, the system can determine if the vehicle is likely parked inside or outside of the garage.

Figure 5:
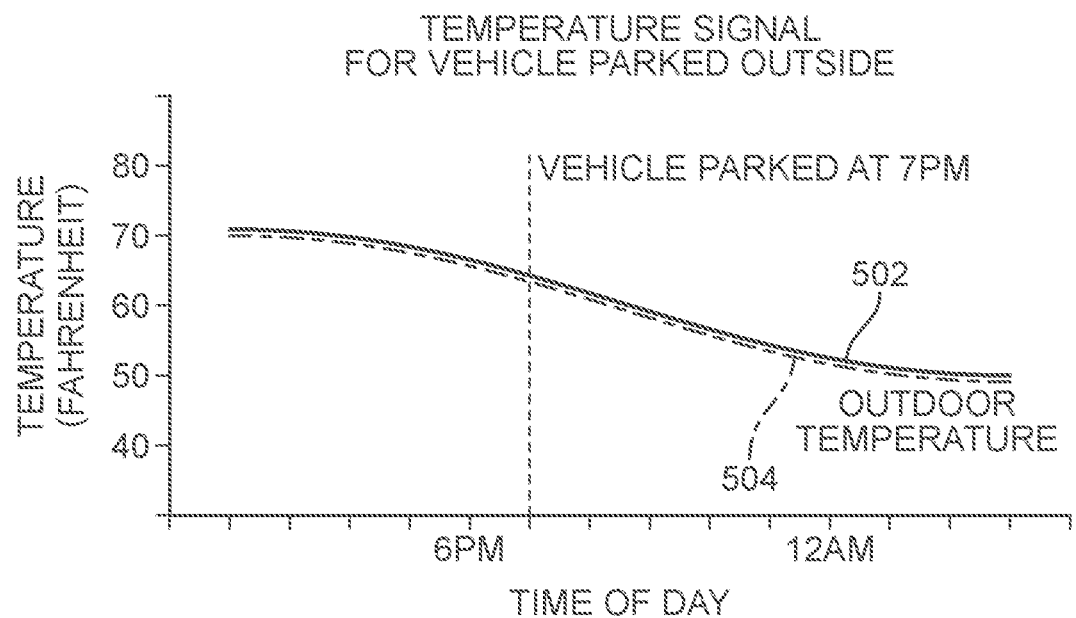
FIGS. 5-6 are schematic views showing relationships between vehicle temperature and outdoor temperature in different situations, according to an embodiment.
Figure 6:
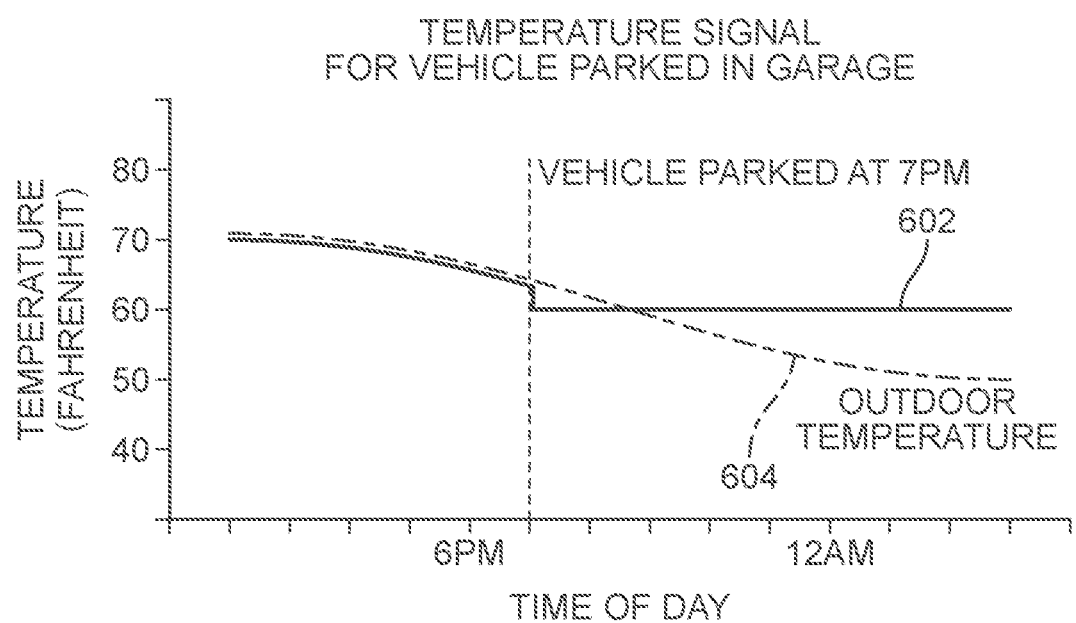

FIGS. 5 and 6 depict schematic views of exemplary data that might be used to determine if a vehicle is being parked in a garage or outside of the garage, over a particular time frame. Specifically, FIG. 5 shows an example of a data signal that indicates that a vehicle is parked outside, while FIG. 6 shows an example of a data signal that indicates that a vehicle is parked in a garage. As seen in FIG. 5, the temperature detected at the vehicle (temperature 502) is substantially similar to the outdoor temperature (temperature 504) throughout the entire tracked period. Most importantly, the temperatures coincide when the vehicle is parked, which is a period starting at 7 pm and lasting the whole night.

By contrast, FIG. 6 depicts a data signal where the temperature detected at the vehicle (temperature 602) diverges from outdoor temperature (temperature 604) once the vehicle is parked at 7 pm. In fact, around 7 pm temperature 602, which is detected at the vehicle, shows a sharp drop of 5-10 degrees, indicating an immediate change in ambient conditions. Such an immediate drop is to be expected if a vehicle enters a garage that has a lower ambient temperature than the surrounding air. After 7 pm the outdoor temperature 604 continues to drop further, while the temperature 602 at the vehicle remains substantially constant. This again suggests the vehicle has been insulated from the outdoors by a garage.

It may be appreciated that patterns such as those depicted schematically in FIGS. 5-6 and be analyzed systematically. In some embodiments, the average difference between the temperature detected at the vehicle and the external temperature over a given period could be calculated and compared to a predetermined tolerance. If the average difference is greater than the predetermined tolerance, it may be assumed that the vehicle was not outside for some or most of the given period. In another embodiment, the data could be analyzed for distinct patterns, such as dramatic dips and rises in the temperature at the vehicle that may indicate that the vehicle has transitioned from outside to a garage (or from a garage to outside). In some cases, machine learning could be used to detect patterns in the data associated with vehicles being parked in a garage vs. vehicles being parked outside.

Similar patterns in ambient conditions can be detected and analyzed for various other kinds of sensory information from any of the other sensors described above. These include, but are not limited to, comparing humidity sensed at the vehicle with outdoor humidity, comparing wind speed sensed at the vehicle with outdoor wind speed, comparing pressure sensed at the vehicle with outdoor pressure and comparing light levels sensed at the vehicle with outdoor light levels. Additionally, some embodiments could compare two or more types of sensory information. For example, a system could compare both the temperature sensed at the vehicle and outside temperature as well as the humidity sensed at the vehicle and outside humidity. Using multiple sources of sensory data, when available, may help increase the accuracy of determining if a vehicle is parked inside or outside of a garage.

Figure 7:
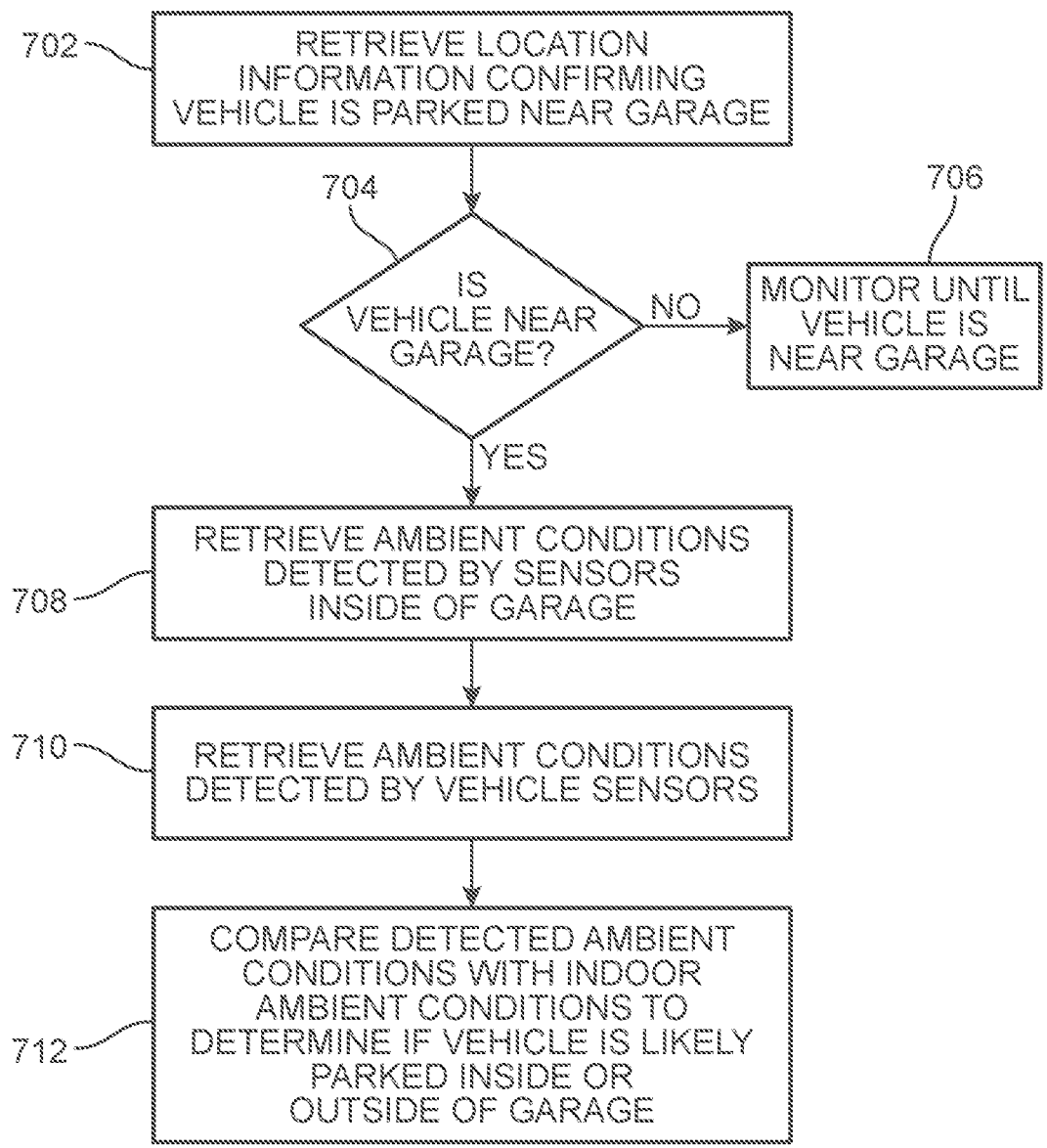
FIG. 7 is a schematic view of a process for determining if a vehicle is being parked in a garage, according to an embodiment.

In another embodiment, a computing system could compare information sensed at a vehicle with ambient conditions within a garage. FIG. 7 depicts a process of using information from sensors within a garage (such as set of garage sensors 272 of FIG. 2) and information from vehicle sensors to determine if a vehicle is parked in a garage. Many of the steps of FIG. 7 may proceed in a similar manner to corresponding steps in FIG. 4. For example, step 702, step 704 and step 706 may be similar to step 402, step 404 and step 406. However, at step 708, the computing system may retrieve the ambient conditions inside of the garage from sensors disposed within the garage, rather than detecting outside ambient conditions as in step 408.

Next, in step 710, the computing system retrieves the ambient conditions detected by any sensors associated with the vehicle. These can include sensors integrated into the vehicle (such as set of vehicle sensors 274). These may also include sensors from a user device disposed in the vehicle (such as user device 230).

Following this, in step 712, the computing system may compare the ambient conditions detected by the vehicle sensors with ambient conditions within the garage. Based on this comparison, the system can determine if the vehicle is likely parked inside or outside of the garage.

Figure 8:
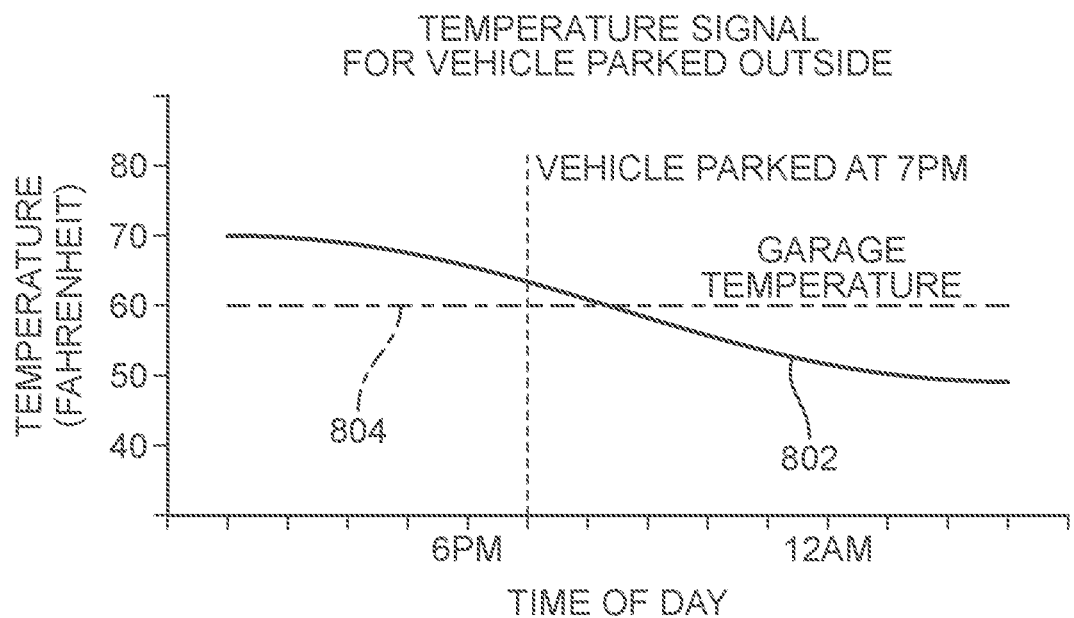
FIGS. 8-9 are schematic views showing relationships between vehicle temperature and outdoor temperature in different situations, according to an embodiment.
Figure 9:
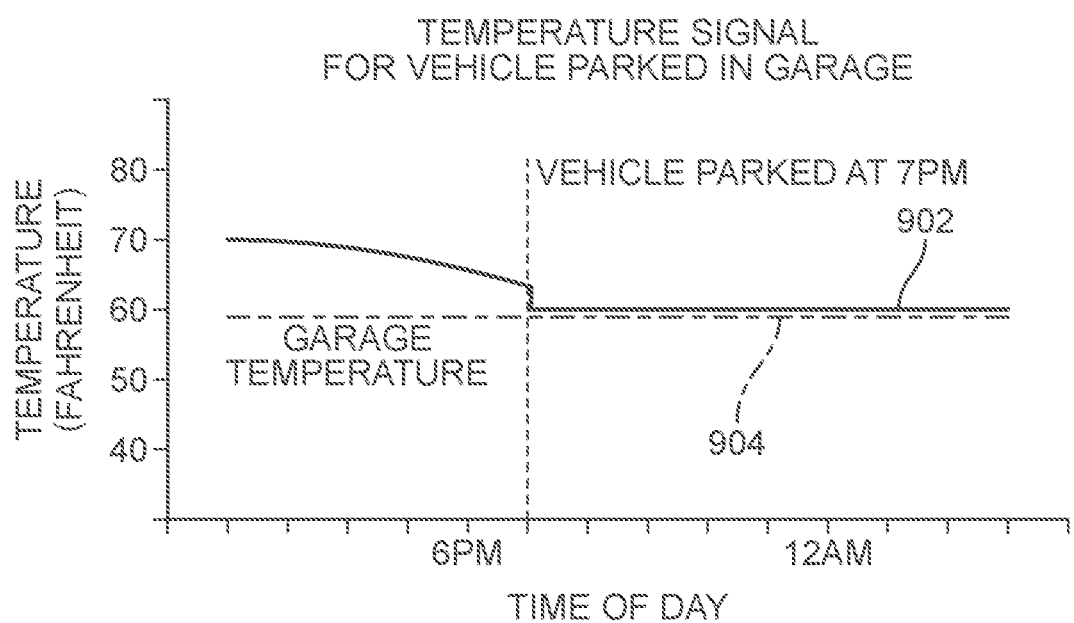

FIGS. 8 and 9 depict schematic views of exemplary data that might be used to determine if a vehicle is being parked in a garage or outside over a particular time frame. Specifically, FIG. 8 shows an example of a data signal that indicates that a vehicle is parked outside, while FIG. 9 shows an example of a data signal that indicates that a vehicle is parked in a garage. As seen in FIG. 8, the temperature sensed at the vehicle (temperature 802) is substantially different than the garage temperature 804 throughout the entire tracked period. Most importantly, the temperatures differ even when the vehicle is parked, which is a period starting at 7 pm and lasting the whole night.

By contrast, FIG. 9 depicts a data signal where the temperature detected at the vehicle (temperature 602) converges with the garage temperature 904 once the vehicle is parked at 7 pm. In fact, around 7 pm the temperature 902 shows a sharp drop of 10-15 degrees, indicating an immediate change in ambient conditions. Moreover, the temperature sensed at the vehicle drops to match the garage temperature 904. Such an immediate change in temperature is to be expected if a vehicle enters a garage that has a lower ambient temperature than the surrounding air.

Figure 10:
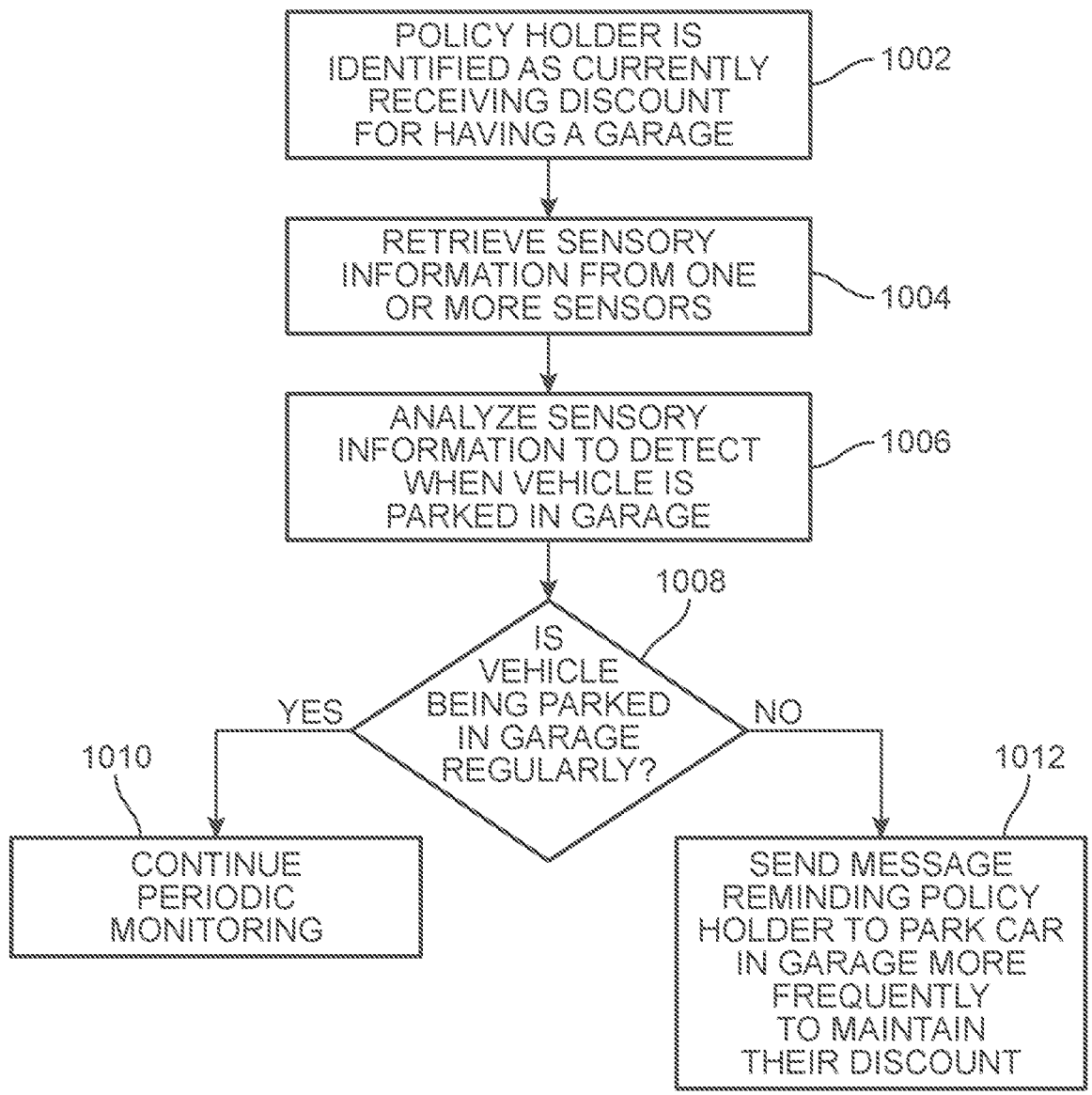
FIG. 10 is a schematic view of a process for reminding a policy holder to use a garage more frequently, according to an embodiment.

FIG. 10 is a schematic view of a process for sending messages to a policy holder when the computing system determines that a vehicle is not being parked in the garage on a regular basis. In step 1002, a computing system identifies a policy holder as already receiving a discount for having a garage. Next, in step 1004 the computing system may retrieve sensory information from one or more sensors.

Next, in step 1006, sensory information could be analyzed to detect if a vehicle is being parked in a garage. This step may include any of the methods described above and depicted in FIGS. 4-9. In step 1008, the computing system determines if the vehicle is being parked in the garage sufficiently regularly. This may include monitoring the vehicle and ambient conditions of the garage and/or outside for some period, detecting how many times the vehicle is parked inside or outside of the garage, and then determining if the frequency of parking the vehicle in the garage is sufficient. In some cases, the number of times a vehicle is parked in a garage over a predetermined time could be compared to a threshold frequency.

If the vehicle is being parked in the garage on regularly (or sufficiently frequently), the computing system may proceed to step 1010. At step 1010, the computing system can continue periodic monitoring to ensure the vehicle continues to be parked in the garage sufficiently frequently.

If the vehicle is not being parked in the garage on a regular basis, the computing system may proceed to step 1012. At step 1012, the computing system may send a message to the policy holder. This message can include a reminder to park his or her car in the garage more frequently to maintain the current discount on their insurance policy (that is, on their premium or their deductible). This message could be provided via text, email or even a call placed by a representative. In some embodiments, the message could be pushed to a mobile device through an application supported by the insurance provider. In still other embodiments, the message could be provided on a display screen in a vehicle prior to when the vehicle is first turned on, but before the vehicle is placed in drive or reverse.

It may be appreciated that in addition to determining a frequency of garage use (or non-use), the embodiments could be configured to detect the total time elapsed in the garage or total time elapsed out of the garage over a given period. That is, the total elapsed time the vehicle spends parked in the garage and/or the total elapsed time the vehicle spends outside of the garage. The analyses described above can be used to detect not only when the vehicle is inside or outside of a garage, but also the duration of time the vehicle spends inside or outside the garage. In some cases, the total time elapsed inside or outside of the garage could be used to adjust insurance policy premiums such that premiums are generally lowered as the total time elapsed inside the garage increases over a given period.

Figure 11:
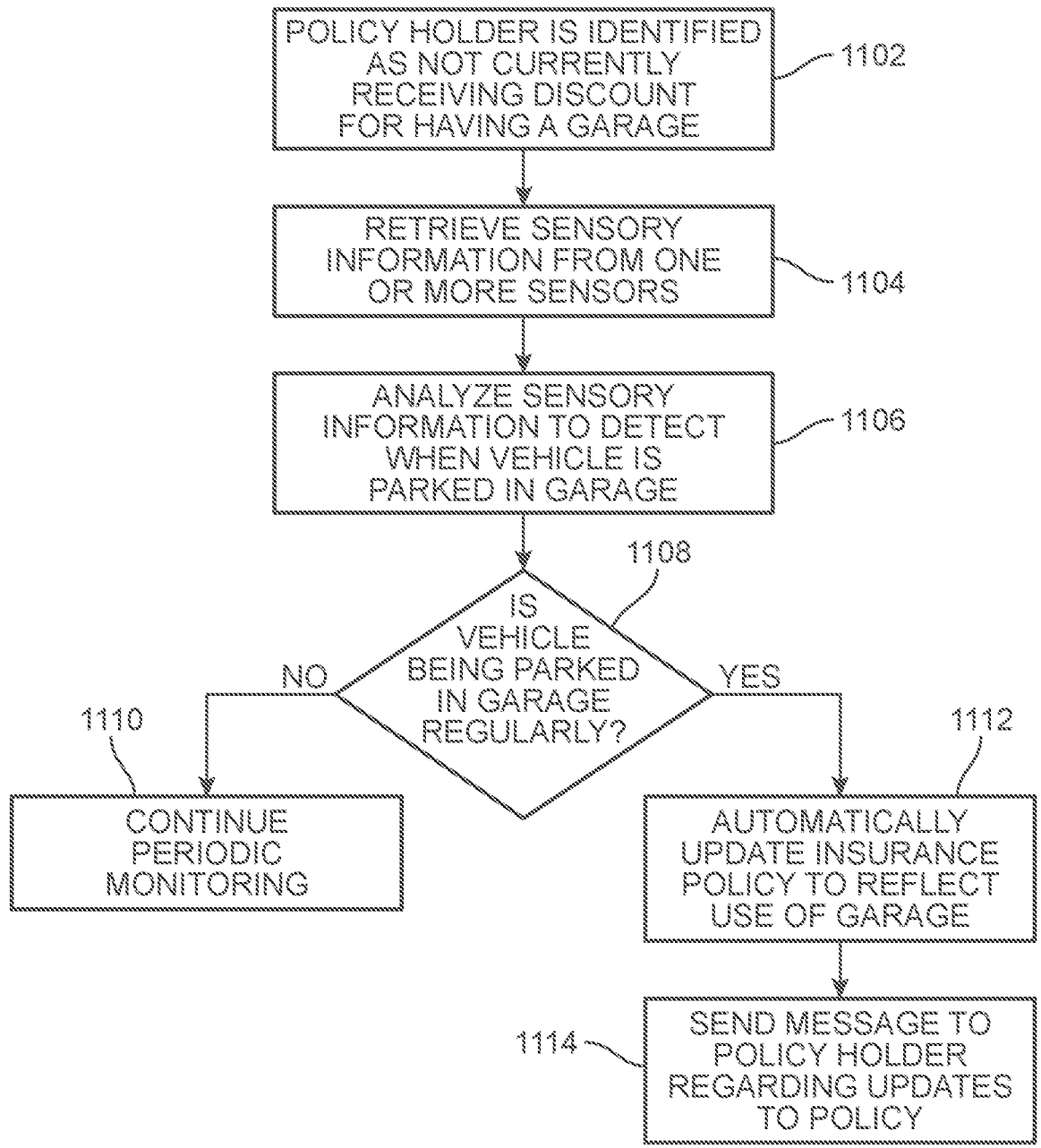
FIG. 11 is a schematic view of a process for automatically updating an insurance policy, according to an embodiment.

FIG. 11 is a schematic process adapted for a policy holder who is not current receiving a discount for having or using a garage. In many cases, the presence of a garage may be determined when a new insurance policy is created. However, in some circumstances this information may not be provided, or the garage could be installed/activated after the initial insurance policy has been created. The exemplary process of FIG. 11 provides a method of automatically updating an insurance policy in response to detecting garage use through sensed information.

In step 1102, a computing system identifies a policy holder as not currently receiving a discount for having or using a garage. In the exemplary embodiment, step 1104, step 1106, and step 1108 may proceed as step 1004, step 1006, and step 1008, respectively, of the process shown in FIG. 10. That is, the computing system may retrieve sensory information, analyze the information, and determine if the vehicle is being parked in a garage regularly (or sufficiently frequently).

If the computing system determines that the vehicle is not being parked in the garage regularly, the computing system may proceed from step 1108 to step 1110. At step 1110 the computing system may continue to monitor garage use. Since the policy holder is not currently receiving a discount for garage use, no action may be necessary when they are not using the garage.

If instead, at step 1108, the computing system detects that a vehicle is being parked in a garage on a regular basis, it may proceed to step 1112. In step 1112, the computing system may automatically update the insurance policy for the vehicle to reflect that the vehicle is being parked in a garage sufficiently frequently. In some cases, the computing system can automatically update the insurance policy premium and/or deductible to include a discount for having and using a garage to park a vehicle. Next, in step 1114, the computing system may send a message to the policy holder to inform him or her of the updates to the policy.

It may be appreciated that the above systems and methods may apply not only to use of a garage attached to the home of the vehicle owner, but to other garages, including public garages, garages at the owner's place of business or any other garages. Since parking the vehicle in a garage may be advantageous in terms of risk mitigation, an insurance provider could use similar principles to those discussed in the exemplary embodiments to determine if a vehicle is being stored in any kind of garage on a regular basis. In some cases, the provider may then offer discounts on insurance premiums for using the garage.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system for determining if a vehicle is being parked in a garage, the vehicle being associated with an insurance policy, the system comprising:
a computing system of a provider of the insurance policy;
a first sensor associated with the vehicle, the first sensor being at least one of a microphone or a camera;
a second sensor disposed inside the garage separate from the vehicle, the second sensor being at least one of a light sensor configured to detect ambient light levels within the garage or an electrical sensor configured to detect electrical activity inside the garage;
wherein the computing system is configured to:
retrieve sensory information from the first sensor;
retrieve sensory information from the second sensor;
correlate the sensory information from the first sensor with the sensory information from the second sensor to determine whether the vehicle is parked in the garage;
calculate a number of times the vehicle is determined to be parked in the garage over a predetermined time period; and
sending a message to an owner of the insurance policy when the vehicle has not been parked in the garage at least once within the predetermined time period.

2. The system according to claim 1, wherein the second sensor is the light sensor configured to detect ambient light levels within the garage and the sensory information from the second sensor is a light level detected within the garage; and
wherein the sensory information from the first sensor is a light level detected at the vehicle.

3. The system according to claim 2, wherein correlating the sensory information from the first sensor with the sensory information from the second sensor to determine whether the vehicle is parked in the garage further comprises:
comparing the light level detected at the vehicle with the light level detected within the garage.

4. The system according to claim 1, wherein the second sensor is the electrical sensor configured to detect electrical activity inside the garage; and
wherein the electrical sensor is connected to a garage door opening system to detect when a garage door of the garage opens and closes.

5. The system according to claim 4, wherein the electrical sensor is a potentiometer.

6. The system according to claim 1, wherein the second sensor is the electrical sensor configured to detect electrical activity inside the garage; and
wherein the electrical sensor is connected to a light switch inside the garage to detect when a light inside the garage controlled by the light switch is turned on or off.

7. The system according to claim 1, wherein the first sensor is the microphone and wherein the sensory information from the first sensor is audio information; and
wherein the computing system is further configured to:
analyze the audio information detected by the microphone to determine if the vehicle is in an indoor environment or an outdoor environment.

8. The system according to claim 1, wherein the first sensor is the camera and wherein the sensory information is from the first sensor is video information; and
wherein the computing system is further configured to:
analyzing the video information showing a forward facing view from the vehicle to determine if the vehicle is in an enclosed space.

9. The system according to claim 8, wherein the forward facing view from the vehicle is obtained just prior to the vehicle being turned off.

10. The system according to claim 8, wherein the forward facing view from the vehicle is obtained just after the vehicle is turned on.

11. A method of determining if a vehicle is being parked in a garage, the vehicle being associated with an insurance policy, the method comprising:

retrieving sensory information from a first sensor associated with the vehicle, the first sensor being at least one of a microphone or a camera;

retrieving sensory information from a second sensor disposed inside the garage separate from the vehicle, the second sensor being at least one of a light sensor configured to detect ambient light levels within the garage or an electrical sensor configured to detect electrical activity inside the garage;

correlating the sensory information from the first sensor with the sensory information from the second sensor to determine whether the vehicle is parked in the garage;

calculating a number of times the vehicle is determined to be parked in the garage over a predetermined time period; and sending a message to an owner of the insurance policy when the vehicle has not been parked in the garage at least once within the predetermined time period.

12. The method according to claim 11, wherein the second sensor is the light sensor configured to detect ambient light levels within the garage and the sensory information from the second sensor is a light level detected within the garage; and wherein the sensory information from the first sensor is a light level detected at the vehicle.

13. The method according to claim 12, wherein correlating the sensory information from the first sensor with the sensory information from the second sensor to determine whether the vehicle is parked in the garage further comprises:

comparing the light level detected at the vehicle with the light level detected within the garage.

14. The method according to claim 11, wherein the second sensor is the electrical sensor configured to detect electrical activity inside the garage; and wherein the electrical sensor is connected to a garage door opening system to detect when a garage door of the garage opens and closes.

15. The method according to claim 11, wherein the second sensor is the electrical sensor configured to detect electrical activity inside the garage; and wherein the electrical sensor is connected to a light switch inside the garage to detect when a light inside the garage controlled by the light switch is turned on or off.

16. The method according to claim 11, wherein the first sensor is the microphone and wherein the sensory information from the first sensor is audio information; and the method further comprising:

analyzing the audio information detected by the microphone to determine if the vehicle is in an indoor environment or an outdoor environment.

17. The method according to claim 11, wherein the first sensor is the camera and wherein the sensory information is from the first sensor is video information; and the method further comprising:

analyzing the video information showing a forward facing view from the vehicle to determine if the vehicle is in an enclosed space.

18. The method according to claim 17, wherein the forward facing view from the vehicle is obtained just prior to the vehicle being turned off or just after the vehicle is turned on.

19. The method according to claim 11, further comprising:

repeating the correlation between the sensory information from the first sensor with the sensory information from the second sensor over the predetermined time period to calculate the number of times the vehicle is parked in the garage during the predetermined time period.

20. The method according to claim 11, further comprising:

automatically updating the insurance policy, based on the number of times the vehicle is parked in the garage during the predetermined time period.

* * * * *